(12) United States Patent
Yang

(10) Patent No.: US 12,556,172 B2
(45) Date of Patent: Feb. 17, 2026

(54) DELAY CIRCUIT AND SEMICONDUCTOR MEMORY

(71) Applicant: Changxin Memory Technologies, Inc., Anhui (CN)

(72) Inventor: Yu Yang, Hefei (CN)

(73) Assignee: Changxin Memory Technologies, Inc., Hefei (CN)

(*) Notice: Subject to any disclaimer, the term of this patent is extended or adjusted under 35 U.S.C. 154(b) by 459 days.

(21) Appl. No.: 18/230,096

(22) Filed: Aug. 3, 2023

(65) Prior Publication Data

US 2023/0378948 A1   Nov. 23, 2023

Related U.S. Application Data

(63) Continuation of application No. PCT/CN2022/092997, filed on May 16, 2022.

(30) Foreign Application Priority Data

Apr. 29, 2022   (CN) .......................... 202210465498.3

(51) Int. Cl.
*G11C 7/04* (2006.01)
*G11C 7/22* (2006.01)
*H03K 5/14* (2014.01)

(52) U.S. Cl.
CPC .................. *H03K 5/14* (2013.01); *G11C 7/04* (2013.01); *G11C 7/222* (2013.01)

(58) Field of Classification Search
CPC ........... H03K 5/14; H03K 2005/00058; H03K 19/21; G11C 7/04; G11C 7/222;

(Continued)

(56) References Cited

U.S. PATENT DOCUMENTS

| 2002/0171496 A1* | 11/2002 | Jordan ................ H03K 3/0315 331/177 R |
| 2005/0135430 A1 | 6/2005 | Le et al. |
| 2012/0286890 A1 | 11/2012 | Terasawa |

FOREIGN PATENT DOCUMENTS

| CN | 1869615 A | 11/2006 |
| CN | 102809899 A | 12/2012 |

(Continued)

OTHER PUBLICATIONS

PCT International Search Report and the Written Opinion mailed Dec. 22, 2022, issued in related International Application No. PCT/CN2022/092997, with partial English machine translation (12 pages).

*Primary Examiner* — Jay W. Radke
(74) *Attorney, Agent, or Firm* — Sheppard Mullin Richter & Hampton LLP

(57) ABSTRACT

Delay circuitry includes a temperature compensation control circuit and a delay circuit. The temperature compensation control circuit is configured to generate a target temperature compensation control signal based on an initial control signal, a real-time ambient temperature signal, a temperature coefficient compensation enable signal, and a temperature coefficient control signal. The delay circuit is connected to the temperature compensation control circuit, and is configured to generate a temperature compensated target delay signal based on the target temperature compensation control signal and an initial delay signal such that a delay time of the target delay signal generated by the delay circuit can be dynamically compensated based on a real-time ambient temperature signal collected by a temperature sensor.

20 Claims, 9 Drawing Sheets

(58) Field of Classification Search
CPC ............... G11C 7/1066; G11C 7/1093; G11C 29/50012; Y02D 10/00; G05F 1/567; H04J 3/06
See application file for complete search history.

(56) References Cited

FOREIGN PATENT DOCUMENTS

| | | |
|---|---|---|
| CN | 109491438 A | 3/2019 |
| CN | 112994665 A | 6/2021 |

\* cited by examiner

DELAY CIRCUIT AND SEMICONDUCTOR MEMORY

CROSS-REFERENCE TO RELATED APPLICATIONS

This application is a continuation application of International Patent Application No. PCT/CN2022/092997, filed on May 16, 2022, which claims priority to Chinese Patent Application No. 202210465498.3, filed with the China National Intellectual Property Administration on Apr. 29, 2022 and entitled "DELAY CIRCUIT AND SEMICONDUCTOR MEMORY". The above-referenced applications are incorporated herein by reference in their entirety.

TECHNICAL FIELD

The present invention relates to the field of integrated circuits, and in particular, to a delay circuit and a semiconductor memory.

BACKGROUND

With the rapid development of integrated circuit technologies, the market imposes higher requirements on the integration of semiconductor products and accuracy of signal transmission. A plurality of circuit modules integrated in an integrated circuit generally need a clock signal to trigger a corresponding functional response. Generally, the input clock signal of the integrated circuit needs to pass through a delay circuit to generate a delay, to trigger a corresponding functional response at a target time.

In a conventional delay circuit, the signal transmission path is affected by the real-time environment, causing deviation between an actual delay time and a predetermined delay time, and affecting stability and reliability of the integrated circuit.

If the impact of the real-time ambient environment on the delay circuit in the integrated circuit can be alleviated, stability and accuracy of signal transmission can be effectively improved, thereby improving performance and reliability of the integrated circuit.

SUMMARY

Some embodiments of the present invention provide delay circuitry and a semiconductor memory.

According to some embodiments, a first aspect of the present invention provides delay circuitry, including a temperature compensation control circuit and a delay circuit. The temperature compensation control circuit is configured to generate a target temperature compensation control signal based on an initial control signal, a real-time ambient temperature signal, a temperature coefficient compensation enable signal, and a temperature coefficient control signal. The delay circuit is connected to the temperature compensation control circuit and is configured to generate a temperature compensated target delay signal based on the target temperature compensation control signal and an initial delay signal.

According to some embodiments, the temperature compensation control circuit includes a target temperature compensation circuit, an addition circuit, and a logic output circuit. The target temperature compensation circuit includes a first input terminal configured to receive the real-time ambient temperature signal, a second input terminal configured to receive the temperature coefficient compensation enable signal, a control terminal configured to receive an initial selection signal, and an output terminal configured to output a target temperature compensation signal. The addition circuit includes a first input terminal configured to receive the initial control signal, a second input terminal connected to the output terminal of the target temperature compensation circuit to receive the target temperature compensation signal, a carry input terminal configured to receive an initial carry signal, a first output terminal configured to output an initial temperature compensation control signal, and a carry output terminal configured to output a target carry signal. The logic output circuit includes a first input terminal connected to the first output terminal of the addition circuit to receive the initial temperature compensation control signal, a second input terminal connected to the carry output terminal of the addition circuit to receive the target carry signal, and a third input terminal configured to receive the initial selection signal and output the target temperature compensation control signal through an output terminal after performing logic processing on the initial temperature compensation control signal, the target carry signal, and the initial selection signal.

According to some embodiments, the addition circuit includes N cascaded adders, where N>1, N is a positive integer, a carry output terminal of an adder at each stage is connected to a carry input terminal of an adder at a next adjacent stage, a carry input terminal of an adder at a first stage serves as the carry input terminal of the addition circuit and is configured to receive the initial carry signal, and a carry output terminal of an adder at a last stage serves as the carry output terminal of the addition circuit and is configured to output the target carry signal; signal output terminals of the adders at all stages jointly output sub-signals for output from the first output terminal of the addition circuit and are connected to the first input terminal of the logic output circuit; first input terminals of the adders at all stages jointly receive sub-signals received at the first input terminal of the addition circuit; and second input terminals of the adders at all stages jointly receive sub-signals received at the second input terminal of the addition circuit.

According to some embodiments, the logic output circuit includes a target overflow prevention sub-circuit and N logic output sub-circuits. The target overflow prevention sub-circuit includes a first input terminal as the third input terminal of the logic output circuit to receive the initial selection signal, and a second input terminal as the second input terminal of the logic output circuit and connected to the carry output terminal of the adder at the last stage. Among the N logic output sub-circuits, a first input terminal of an i-th logic output sub-circuit is connected to a signal output terminal of an adder at an i-th stage, a second input terminal of each of the logic output sub-circuits is connected to a first output terminal of the target overflow prevention sub-circuit, a third input terminal of each of the logic output sub-circuits is connected to a second output terminal of the target overflow prevention sub-circuit, output terminals of the logic output sub-circuits jointly output sub-signals for output from the output terminal of the logic output circuit, first input terminals of the logic output sub-circuits jointly receive sub-signals received at the first input terminal of the logic output circuit, i∈(1, N], and i is a positive integer. The target overflow prevention sub-circuit is configured to prevent an operation result of the addition circuit from overflowing.

According to some embodiments, the target overflow prevention sub-circuit includes a first NOR gate and a first AND gate. The first NOR gate includes a first input terminal configured to receive the initial selection signal, a second input terminal connected to the carry output terminal of the adder at the last stage, and an output terminal as the first output terminal of the target overflow prevention sub-circuit and connected to the second input terminal of each of the logic output sub-circuits. The first AND gate includes a first input terminal configured to receive the initial selection signal, a second input terminal connected to the carry output terminal of the adder at the last stage, and an output terminal as the second output terminal of the target overflow prevention sub-circuit and connected to the third input terminal of each of the logic output sub-circuits. The first input terminal of the first NOR gate and the first input terminal of the first AND gate jointly receive sub-signals received at the first input terminal of the target overflow prevention sub-circuit, and the second input terminal of the first NOR gate and the second input terminal of the first AND gate jointly receive sub-signals received at the second input terminal of the target overflow prevention sub-circuit.

According to some embodiments, the logic output sub-circuit includes a first inverter, a second NOR gate, and a first OR gate. An input terminal of the first inverter serves as the first input terminal of the logic output sub-circuit. The second NOR gate includes a first input terminal connected to an output terminal of the first inverter, and a second input terminal as the second input terminal of the logic output sub-circuit and connected to the output terminal of the first NOR gate. The first OR gate includes a first input terminal connected to an output terminal of the second NOR gate, a second input terminal as the third input terminal of the logic output sub-circuit and connected to the output terminal of the first AND gate, and an output terminal as the output terminal of the logic output sub-circuit.

According to some embodiments, the real-time ambient temperature signal includes N temperature sub-signals, the target temperature compensation signal includes N target temperature compensation sub-signals, and the target temperature compensation circuit includes N target temperature compensation sub-circuits. An i-th target temperature compensation sub-circuit includes a first input terminal configured to receive an i-th temperature sub-signal, a second input terminal configured to receive the temperature coefficient compensation enable signal, a control terminal configured to receive the initial selection signal, and an output terminal configured to provide an i-th target temperature compensation sub-signal to the second input terminal of an adder at an i-th stage, where i∈(1, N] and i is a positive integer. First input terminals of the target temperature compensation sub-circuits jointly receive sub-signals received at the first input terminal of the target temperature compensation circuit, second input terminals of the target temperature compensation sub-circuits jointly receive sub-signals received at the second input terminal of the target temperature compensation circuit, and control terminals of the target temperature compensation sub-circuits jointly receive sub-signals received at the control terminal of the target temperature compensation circuit.

According to some embodiments, the target temperature compensation sub-circuit includes a first NAND gate and a selection output sub-circuit. The first NAND gate includes a first input terminal as the first input terminal of the target temperature compensation sub-circuit and configured to receive the temperature sub-signal, a second input terminal as the second input terminal of the target temperature compensation sub-circuit and configured to receive the temperature coefficient compensation enable signal, and an output terminal outputting an intermediate temperature sub-signal. The selection output sub-circuit includes an input terminal connected to the output terminal of the first NAND gate, a control terminal as the control terminal of the target temperature compensation sub-circuit and configured to receive the initial selection signal, and an output terminal as the output terminal of the target temperature compensation sub-circuit and configured to output the target temperature compensation sub-signal. If the initial selection signal has a high level, the target temperature compensation sub-signal and the intermediate temperature sub-signal are reverse-phase signals, or if the initial selection signal has a low level, the target temperature compensation sub-signal and the intermediate temperature sub-signal are in-phase signals.

According to some embodiments, the temperature compensation control circuit further includes a temperature coefficient control circuit. The temperature coefficient control circuit includes a first input terminal configured to receive the temperature coefficient compensation enable signal, a second input terminal configured to receive the temperature coefficient control signal, a third input terminal configured to receive an N-th temperature sub-signal, and an output terminal outputting the initial selection signal. The output terminal of the temperature coefficient control circuit is connected to the control terminal of the target temperature compensation circuit.

According to some embodiments, the temperature coefficient control circuit includes a first XOR gate and a second AND gate. The first XOR gate includes a first input terminal as the third input terminal of the temperature coefficient control circuit and configured to receive the N-th temperature sub-signal, and a second input terminal as the second input terminal of the temperature coefficient control circuit and configured to receive the temperature coefficient control signal. The second AND gate includes a first input terminal connected to an output terminal of the first XOR gate, a second input terminal as the first input terminal of the temperature coefficient control circuit and configured to receive the temperature coefficient compensation enable signal, and an output terminal as the output terminal of the temperature coefficient control circuit and configured to output the initial selection signal.

According to some embodiments, the initial selection signal and the initial carry signal are reverse-phase signals.

According to some embodiments, the initial control signal includes N initial control sub-signals, the first input terminal of an adder at an i-th stage is configured to receive an i-th initial control sub-signal, i∈(1, N], and i is a positive integer.

According to some embodiments, the target temperature compensation control signal includes N target temperature compensation control sub-signals, and the i-th logic output sub-circuit is configured to output an i-th target temperature compensation control sub-signal.

According to some embodiments, the delay circuit includes N target delay sub-circuits and N target logic input sub-circuits. An input terminal of the first target delay sub-circuit is configured to receive the initial delay signal. An i-th target logic input sub-circuit includes a first input terminal connected to an input terminal of the i-th target delay sub-circuit, a second input terminal connected to an output terminal of the i-th target delay sub-circuit, and a third input terminal configured to receive the i-th target temperature compensation control sub-signal. An output terminal of an N-th target logic input sub-circuit serves as an output terminal of the delay circuit and is configured to output the target delay signal. An input terminal of a j-th target delay sub-circuit is connected to an output terminal of a (j−1)-th target logic input sub-circuit, where j ∈[2, N] and j is a positive integer.

According to some embodiments, the target logic input sub-circuit includes a second OR gate and a third AND gate. The second OR gate includes a first input terminal as the second input terminal of the target logic input sub-circuit, and a second input terminal as the third input terminal of the target logic input sub-circuit and configured to receive the target temperature compensation control sub-signal. The third AND gate includes a first input terminal as the first input terminal of the target logic input sub-circuit, a second input terminal connected to an output terminal of the second OR gate, and an output terminal as the output terminal of the target logic input sub-circuit.

According to some embodiments, a second aspect of the present invention provides a semiconductor memory, including the delay circuitry in any one of some embodiments of the present invention.

Details of one or more embodiments of the present invention are provided in the following accompanying drawings and descriptions. Other features, objectives, and advantages of the present invention become clear in the specification, accompanying drawings, and claims.

BRIEF DESCRIPTION OF DRAWINGS

To describe technical solutions in some embodiments of the present invention more clearly, the following briefly describes the accompanying drawings needed for describing some embodiments. Clearly, the accompanying drawings in the following description show merely some embodiments of the present invention, and a person of ordinary skill in the art can still derive other drawings from these accompanying drawings without creative efforts.

DESCRIPTION OF EMBODIMENTS

To facilitate understanding of the present invention, the following describes the present invention in more detail with reference to related accompanying drawings. The accompanying drawings show some example embodiments of the present invention. However, the present invention can be implemented in many different forms and is not limited to the some embodiments described herein. On the contrary, these embodiments are provided to make the content of the present invention more thorough and comprehensive.

Unless otherwise specified, all technical and scientific terms used in this specification have the same meanings as those usually understood by a person skilled in the art of the present invention. Terms used in this specification of the present invention are merely intended to describe some specific embodiments, but not to limit the present invention.

In addition, some terms used throughout this specification and the appended claims indicate specific elements. A person skilled in the art should understand that a manufacturer may use different names to indicate an element. This specification is not intended to distinguish between elements having different names but the same function. In the following descriptions and some embodiments, terms "comprise" and "include" are both used in an open-ended manner and therefore should be interpreted as "including, but not limited to" Similarly, term "connect" is intended to mean an indirect or direct electrical connection. Correspondingly, if a device is connected to another device, the connection may be implemented through direct electrical connection, or may be implemented through indirect electrical connection by using other devices and connectors.

It should be understood that although terms "first", "second", and the like can be used in this specification to describe elements, these elements should not be limited by these terms. These terms are merely used to distinguish one element from another. For example, without departing from the scope of the present invention, a first element may be referred to as a second element, and similarly, a second element may be referred to as a first element.

Figure 1:
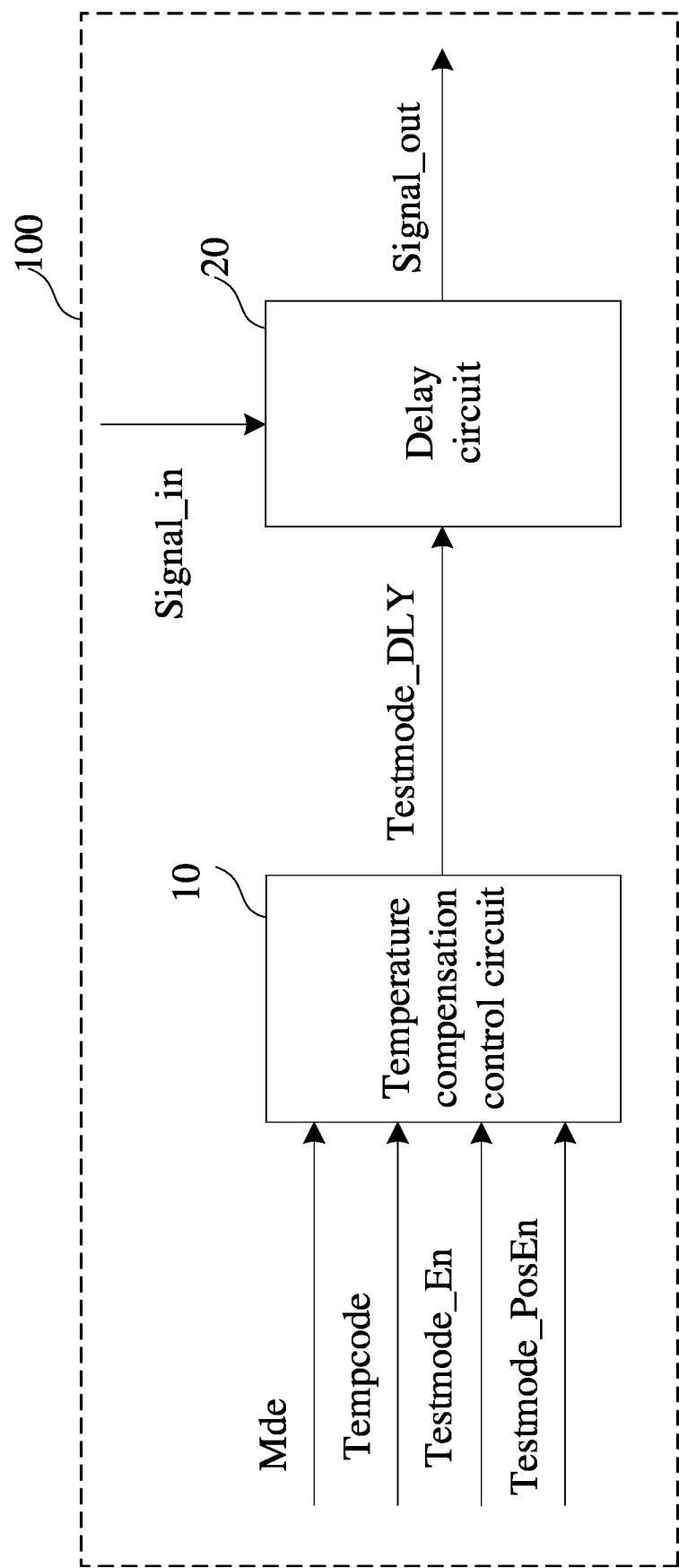
FIG. 1 to FIG. 6 are schematic diagrams of delay circuitry according to some different embodiments of the present invention.

Referring to FIG. 1, some embodiments of the present invention provide delay circuitry 100, including a temperature compensation control circuit 10 and a delay circuit 20. The temperature compensation control circuit 10 is configured to generate a target temperature compensation control signal Testmode_DLY based on an initial control signal Mde, a real-time ambient temperature signal Tempcode, a temperature coefficient compensation enable signal Testmode_En, and a temperature coefficient control signal Testmode_PosEn. The delay circuit 20 is connected to the temperature compensation control circuit 10 and is configured to generate a temperature compensated target delay signal Signal_out based on the target temperature compensation control signal Testmode_DLY and an initial delay signal Signal_in.

Specifically, still referring to FIG. 1, a temperature compensation control circuit 10 generates a target temperature compensation control signal Testmode_DLY based on an initial control signal Mde, a real-time ambient temperature signal Tempcode, a temperature coefficient compensation enable signal Testmode_En, and a temperature coefficient control signal Testmode_PosEn, and a target temperature compensation control signal Testmode_DLY is used to control a delay circuit 20 to compensate a change amount of a signal delay time caused by a temperature change to obtain a temperature compensated target delay signal Signal_out such that an actual delay time of the delay circuitry 100 reaches an expected value. As such, a delay time of a target delay signal Signal_out generated by the delay circuitry 100 is dynamically compensated based on the real-time ambient temperature signal Tempcode, thereby avoiding a large difference between a delay time of an actually generated target delay signal Signal_out and a delay time of a desired target delay signal Signal_out caused by a temperature change, improving stability and accuracy of signal transmission, and improving performance and reliability of an integrated circuit.

Figure 2:
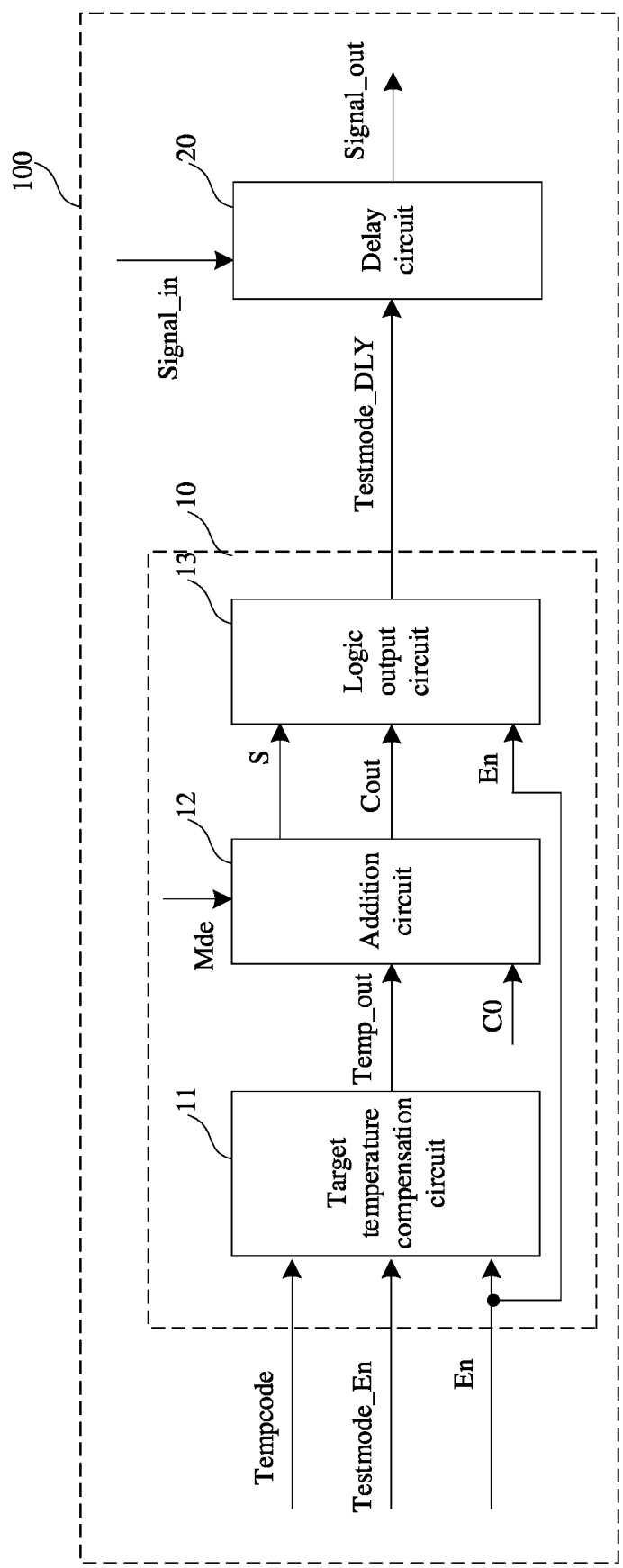

In some embodiments, referring to FIG. 2, the temperature compensation control circuit 10 includes a target temperature compensation circuit 11, an addition circuit 12, and a logic output circuit 13. The target temperature compensation circuit 11 includes a first input terminal configured to receive the real-time ambient temperature signal Tempcode, a second input terminal configured to receive the temperature coefficient compensation enable signal Testmode_En, a control terminal configured to receive an initial selection signal En, and an output terminal configured to output a target temperature compensation signal Temp_out. The addition circuit 12 includes a first input terminal configured to receive the initial control signal Mde, a second input terminal connected to the output terminal of the target temperature compensation circuit 11 to receive the target temperature compensation signal Temp out, a carry input terminal configured to receive an initial carry signal C0, a first output terminal configured to output an initial temperature compensation control signal S, and a carry output terminal configured to output a target carry signal Cout. The logic output circuit 13 includes a first input terminal connected to the first output terminal of the addition circuit 12 to receive the initial temperature compensation control signal S, a second input terminal connected to the carry output terminal of the addition circuit 12 to receive the target carry signal Cout, and a third input terminal configured to receive the initial selection signal En and output the target temperature compensation control signal Testmode_DLY through an output terminal after performing logic processing on the initial temperature compensation control signal S, the target carry signal Cout, and the initial selection signal En. The target temperature compensation circuit 11 is configured to generate the temperature compensated target temperature compensation signal Tempout based on the real-time ambient temperature signal Tempcode, the temperature coefficient compensation enable signal Testmode_En, and the initial selection signal En, and then the addition circuit 12 is configured to perform addition processing on the target temperature compensation signal Temp_out and the initial control signal Mde to obtain the initial temperature compensation control signal S such that the logic output circuit 13 performs logic processing on the initial temperature compensation control signal S, the target carry signal Cout, and the initial selection signal En, and then outputs the target temperature compensation control signal Testmode_DLY. As such, the delay circuit 20 generates the temperature compensated target delay signal Signalout based on the target temperature compensation control signal Testmode_DLY and the initial delay signal Signal_in. It can be understood that the signals used in the present invention are all represented by digital signals and can be subject to binary operations.

Figure 3A:
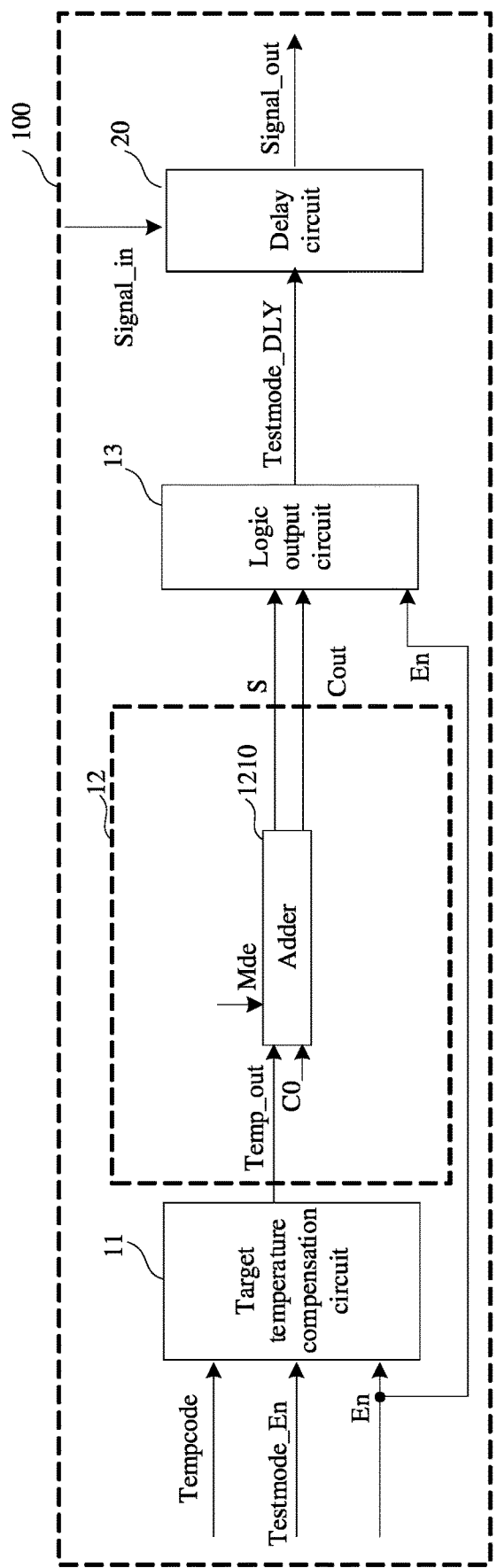

In some embodiments, referring to FIG. 3a, the addition circuit 12 includes an adder 1210. The adder 1210 includes a first input terminal configured to receive an initial control signal Mde, a second input terminal connected to an output terminal of the target temperature compensation circuit 11 to receive a target temperature compensation signal Tempout, a carry input terminal configured to receive an initial carry signal C0, a signal output terminal connected to a first input terminal of the logic output circuit 13 and configured to provide an initial temperature compensation control signal S to the logic output circuit 13, and a carry output terminal configured to output a target carry signal Cout and provide the target carry signal Cout to the logic output circuit 13. After receiving a real-time ambient temperature signal Tempcode collected by a temperature sensor, the target temperature compensation circuit 11 generates the target temperature compensation signal Tempout based on the real-time ambient temperature signal Tempcode, the initial selection signal En, and the temperature coefficient compensation enable signal Testmode_En. The adder 1210 provides the initial temperature compensation control signal S and the target carry signal Cout to the logic output circuit 13 based on the target temperature compensation signal Tempout and the initial carry signal C0 such that the logic output circuit 13 generates the target temperature compensation control signal Testmode_DLY based on the initial temperature compensation control signal S, the target carry signal Cout, and the initial selection signal En. As such, the delay circuit 20 generates the temperature compensated target delay signal Signal out based on the target temperature compensation control signal Testmode_DLY and the initial delay signal Signal_in.

Figure 3B:
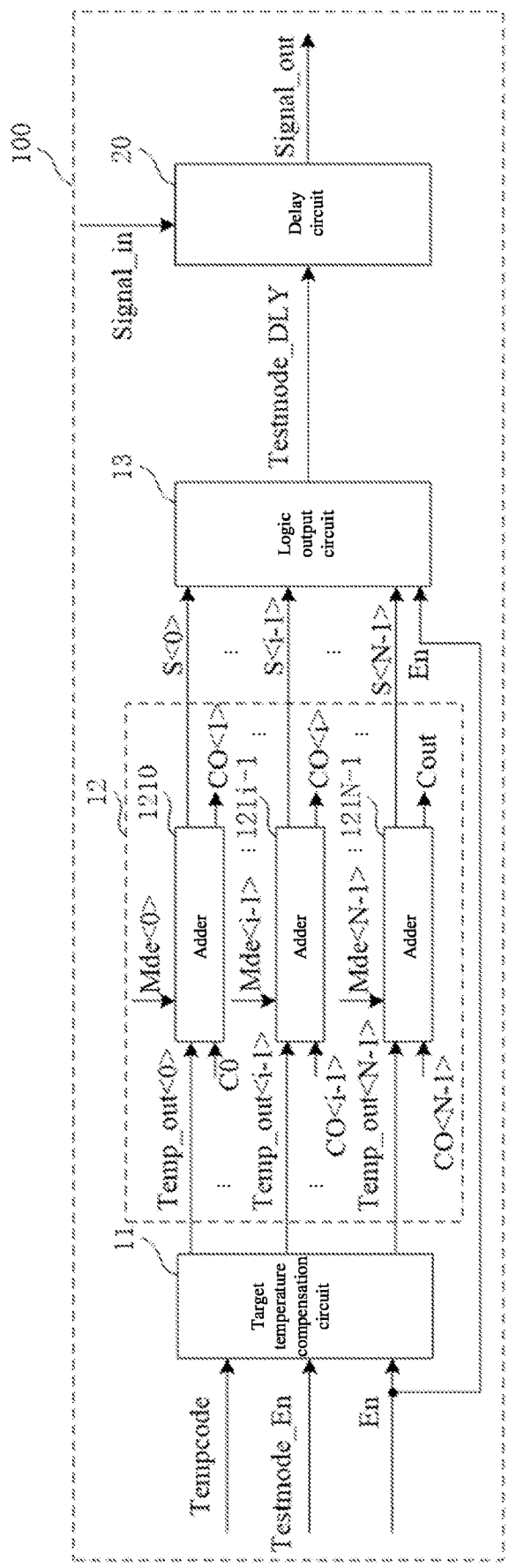

In some embodiments, referring to FIG. 3b, the addition circuit 12 includes N cascaded adders 1210, ... , adder 121$i$-1, ... , and adder 121N-1, where i∈(1, N], both i and N are positive integers, and N>1. A carry output terminal of an adder at each stage is connected to a carry input terminal of an adder at a next adjacent stage, a carry input terminal of an adder 1210 at a first stage serves as the carry input terminal of the addition circuit 12 and is configured to receive the initial carry signal C0, and a carry output terminal of an adder 121N-1 at a last stage serves as the carry output terminal of the addition circuit 12 and is configured to output the target carry signal Cout. Signal output terminals of the adders at all stages jointly output sub-signals for output from the first output terminal of the addition circuit 12 and are connected to the first input terminal of the logic output circuit 13. Signal output terminals of the adders at all stages output corresponding initial temperature compensation control signals S<N−1:0> and provide the initial temperature compensation control signals S<N−1:0> to the logic output circuit 13. First input terminals of the adders at all stages jointly receive sub-signals received at the first input terminal of the addition circuit 12 for receiving an initial control signal Mde<N−1:0>. Second input terminals of the adders 121 at all stages jointly receive sub-signals received at the second input terminal of the addition circuit 12 for receiving a target temperature compensation signal Tempout<N−1:0>.

In some embodiments, still referring to FIG. 3b, the initial control signal Mde can be set to include a total of N initial control sub-signals: an initial control sub-signal Mde <0>, ... , an initial control sub-signal Mde<i−1>, ... , and an initial control sub-signal Mde<N−1>. The initial temperature compensation control signal S includes a total of N initial temperature compensation control sub-signals: an initial temperature compensation control sub-signal S<0>, ... , an initial temperature compensation control sub-signal S<i−1>, ... , and an initial temperature compensation control sub-signal S<N−1>. The target temperature compensation signal Temp_out includes a total of N target temperature compensation sub-signals: a target temperature compensation sub-signal Temp_out<0>, ... , a target temperature compensation sub-signal Temp_out<i−1>, ... , and a target temperature compensation sub-signal Temp_out<N−1>. The carry input terminal of the adder 1210 at the first stage is configured to receive the initial carry signal C0, and the carry output terminal of the adder 121N-1 at the last stage is configured to output the target carry signal Cout. A first input terminal of an adder 121$i$-1 at an i-th stage is configured to receive an i-th initial control sub-signal Mde<i−1>, a second input terminal is configured to receive a target temperature compensation sub-signal Temp_out<i−1>, a carry output terminal is connected to a carry input terminal of an adder 121$i$ at a next adjacent stage, that is, at an (i+1)-th stage, a signal output terminal outputs a corresponding initial temperature compensation control sub-signal S<i−1> and provides the initial temperature compensation control sub-signal S<i−1> to the logic output circuit 13, where i∈(1, N], both i and N are positive integers, and N>1. The addition circuit 12 is configured to include adders with a quantity being equal to a quantity of temperature sub-signals in the real-time ambient temperature signal Tempcode, and the adders are configured to be cascaded. As such, a delay time of the initial control signal is dynamically compensated using the temperature sub-signals in the real-time ambient temperature signal Tempcode to obtain a temperature compensated target delay signal Signal_out such that an actual delay time of the delay circuitry 100 reaches an expected value, thereby avoiding a large difference between a delay time of an actually generated target delay signal Signal_out and a delay time of a desired target delay signal Signal_out caused by a temperature change, improving stability and accuracy of signal transmission, and improving performance and reliability of an integrated circuit.

Figure 4:
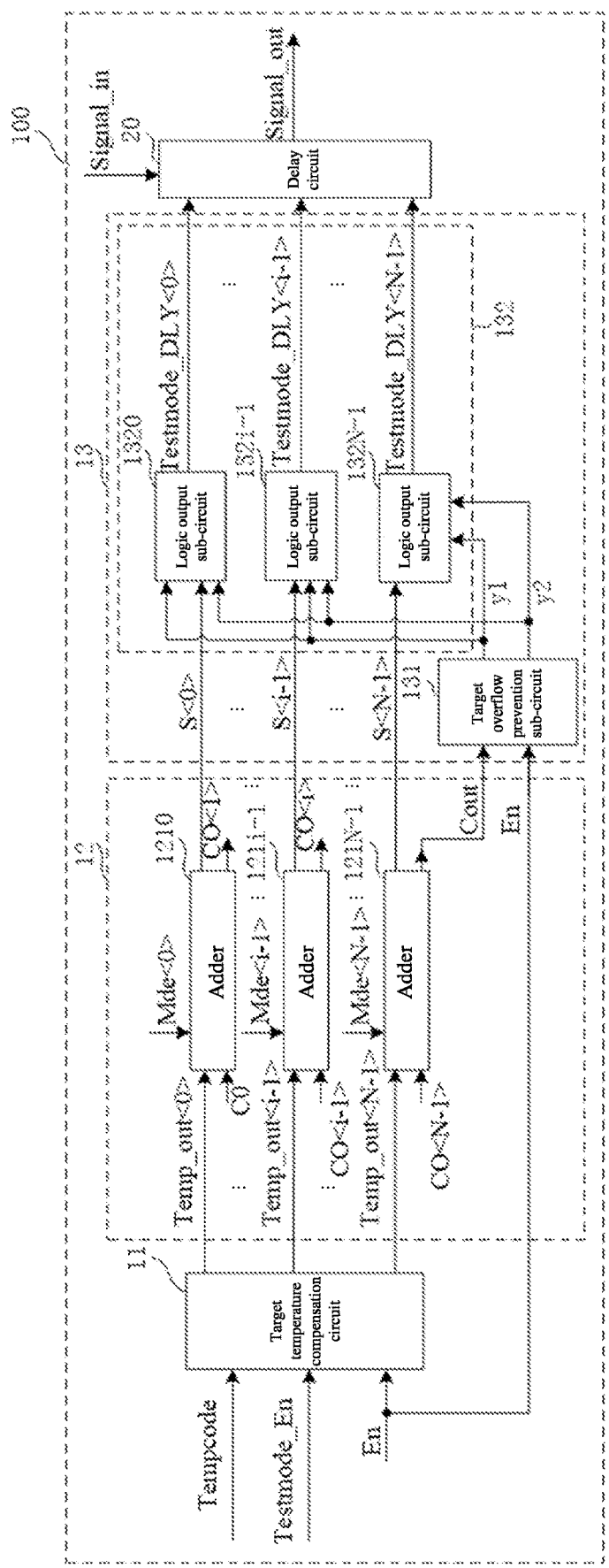

In some embodiments, referring to FIG. 4, the logic output circuit 13 includes a target overflow prevention sub-circuit 131 and N logic output sub-circuits, including a logic output sub-circuit 1320, ..., a logic output sub-circuit 132$i$-1, ..., and a logic output sub-circuit 132N-1. The target overflow prevention sub-circuit 131 includes a first input terminal as the third input terminal of the logic output circuit 13 to receive the initial selection signal En, and a second input terminal as the second input terminal of the logic output circuit 13 and connected to the carry output terminal of the adder 121N-1 at the last stage for receiving the target carry signal Cout. Among the N logic output sub-circuits, a first input terminal of an i-th logic output sub-circuit 132$i$-1 is connected to a signal output terminal of an adder 121$i$-1 at an i-th stage for receiving a corresponding initial temperature compensation control sub-signal S<i−1>. A second input terminal of each of the logic output sub-circuits is connected to a first output terminal of the target overflow prevention sub-circuit 131 to receive a first overflow prevention signal y1. A third input terminal of each of the logic output sub-circuits is connected to a second output terminal of the target overflow prevention sub-circuit 131 to receive a second overflow prevention signal y2. Output terminals of the logic output sub-circuits jointly output sub-signals for output from the output terminal of the logic output circuit 13 for outputting a target temperature compensation control signal Testmode_DLY<N−1:0>. First input terminals of the logic output sub-circuits jointly receive sub-signals received at the first input terminal of the logic output circuit 13 for receiving an initial temperature compensation control signal S, where i∈(1, N], both i and N are positive integers, and N>1. The target overflow prevention sub-circuit 131 is configured to prevent an operation result of the addition circuit 12 from overflowing.

In some embodiments, still referring to FIG. 4, the target temperature compensation control signal Testmode_DLY can be set to include a total of N target temperature compensation control sub-signals: a target temperature compensation control sub-signal Testmode_DLY<0>, ..., a target temperature compensation control sub-signal Testmode_DLY<i−1>, ..., and a target temperature compensation control sub-signal Testmode_DLY<N−1>. The i-th logic output sub-circuit 132$i$-1 includes a first input terminal connected to a signal output terminal of the adder 121$i$-1 at the i-th stage for receiving a corresponding initial temperature compensation control sub-signal S<i−1>, a second input terminal connected to a first output terminal of the target overflow prevention sub-circuit 131 for receiving a first overflow prevention signal y1, a third input terminal connected to a second output terminal of the target overflow prevention sub-circuit 131 for receiving a second overflow prevention signal y2, and an output terminal configured to output an i-th target temperature compensation control sub-signal Testmode_DLY<i−1>, where i∈(1, N], both i and N are positive integers, and N>1. The addition circuit 12 is configured to include adders with a quantity being equal to a quantity of temperature sub-signals in the real-time ambient temperature signal Tempcode, and the adders are configured to be cascaded. As such, a delay time of the initial control signal is dynamically compensated using the temperature sub-signals in the real-time ambient temperature signal Tempcode. In addition, logic output sub-circuits in a one-to-one correspondence with the adders are configured. Each logic output sub-circuit performs logic processing on the first overflow prevention signal y1, second overflow prevention signal y2, and initial temperature compensation control signal S, and then outputs the target temperature compensation control signal Testmode_DLY.

Figure 5:
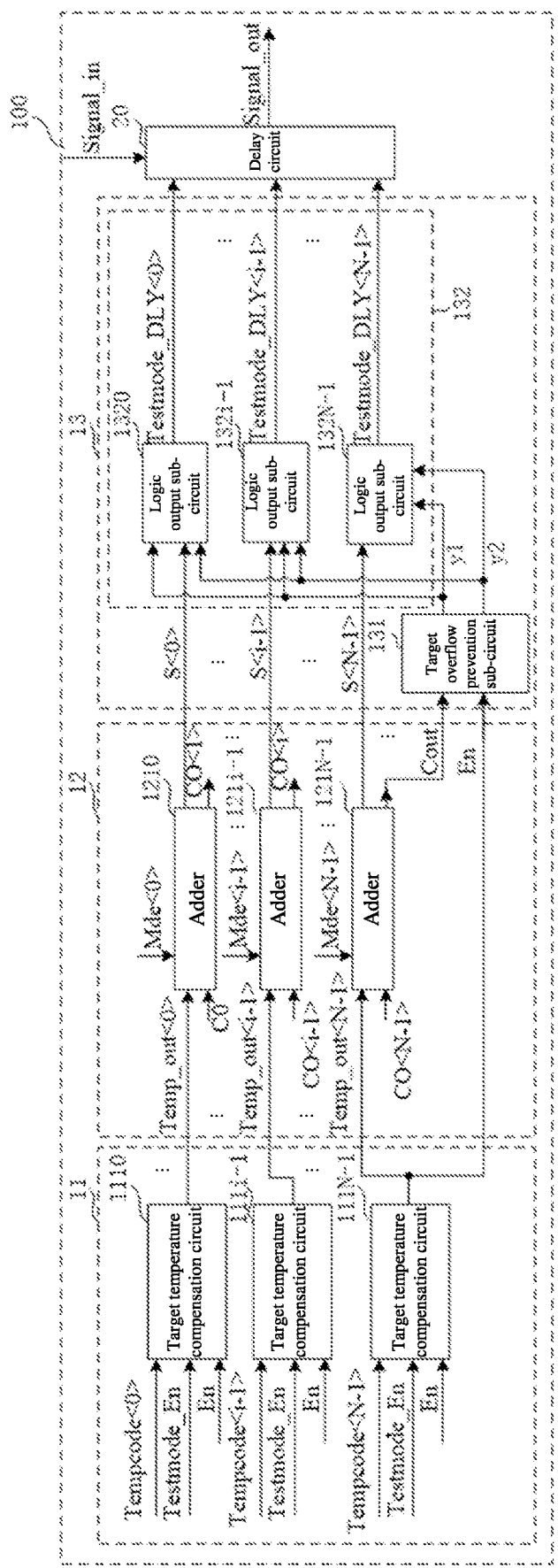

In some embodiments, referring to FIG. 5, the real-time ambient temperature signal Tempcode includes a total of N temperature sub-signals: a temperature sub-signal Tempcode<0>, ..., a temperature sub-signal Tempcode<i−1>, ..., and a temperature sub-signal Tempcode<N−1>. The target temperature compensation signal Tempout includes a total of N target temperature compensation sub-signals: a target temperature compensation sub-signal Tempout<0>, ..., a target temperature compensation sub-signal Tempout<i−1>, ..., and a target temperature compensation sub-signal Temp_out<N−1>. The target temperature compensation circuit 11 includes a total of N target temperature compensation sub-circuits: a target temperature compensation sub-circuit 1110, ..., a target temperature compensation sub-circuit 111$i$-1, ..., and a target temperature compensation sub-circuit 111N-1. An i-th target temperature compensation sub-circuit 111$i$-1 includes a first input terminal configured to receive an i-th temperature sub-signal Tempcode<i−1>, a second input terminal configured to receive the temperature coefficient compensation enable signal Testmode_En, a control terminal configured to receive the initial selection signal En, and an output terminal configured to provide an i-th target temperature compensation sub-signal Temp_out<i−1> to the second input terminal of an adder 121$i$-1 at an i-th stage, where i∈(1, N], both i and N are positive integers, and N>1. First input terminals of the target temperature compensation sub-circuits jointly receive sub-signals received at the first input terminal of the target temperature compensation circuit 11 for receiving a corresponding temperature sub-signal. Second input terminals of the target temperature compensation sub-circuits jointly receive sub-signals received at the second input terminal of the target temperature compensation circuit 11 for receiving a temperature coefficient compensation enable signal Testmode_En. Control terminals of the target temperature compensation sub-circuits jointly receive sub-signals received at the control terminal of the target temperature compensation circuit for receiving an initial selection signal En. Output terminals of the target temperature compensation sub-circuits jointly output sub-signals for output from the output terminal of the target temperature compensation circuit for outputting a target temperature compensation signal. The target temperature compensation circuit 11 is configured to include target temperature compensation sub-circuits in a one-to-one correspondence with the temperature sub-signals such that each target temperature compensation sub-circuit outputs a corresponding target temperature compensation sub-signal based on the temperature sub-signal, the temperature coefficient compensation enable signal Testmode_En, and the initial selection signal En.

Figure 6:
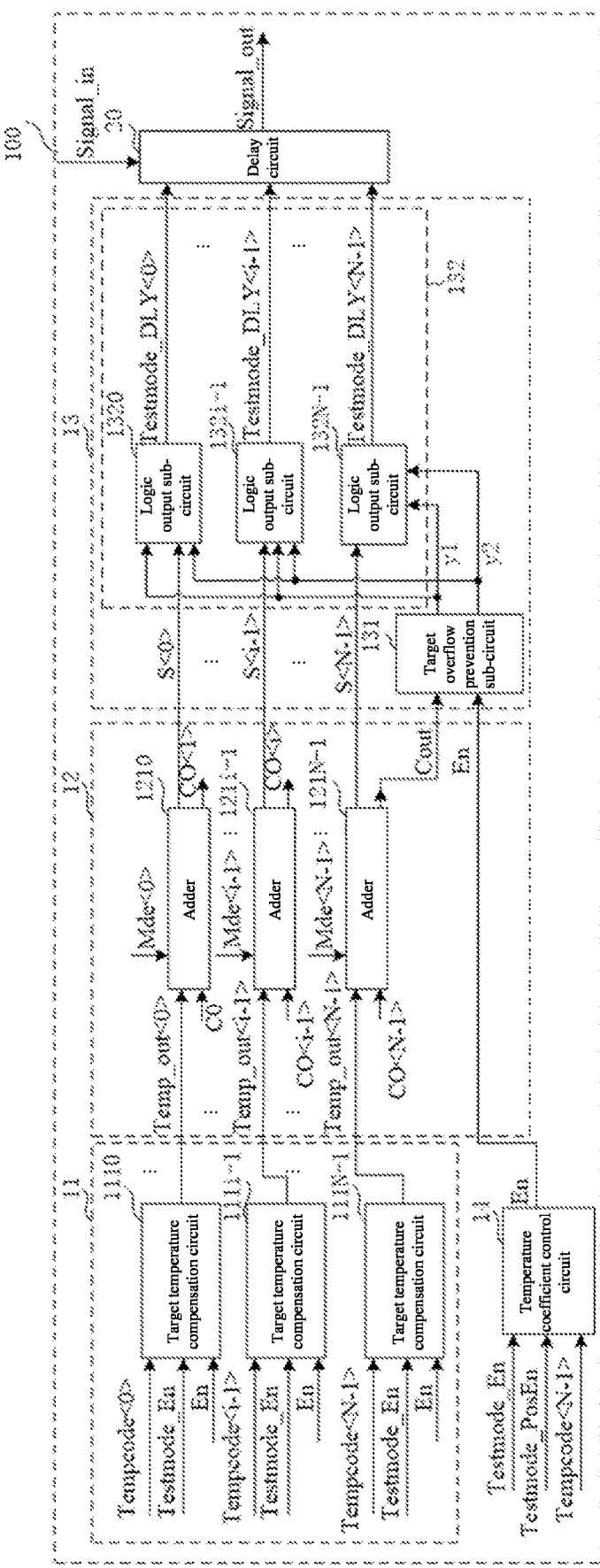

In some embodiments, referring to FIG. 6, the temperature compensation control circuit further includes a temperature coefficient control circuit 14. The temperature coefficient control circuit 14 includes a first input terminal configured to receive the temperature coefficient compensation enable signal Testmode_En, a second input terminal configured to receive the temperature coefficient control signal Testmode_PosEn, a third input terminal configured to receive an N-th temperature sub-signal Tempcode<N−1>, and an output terminal outputting the initial selection signal En, where i∈(1, N], both i and N are positive integers, and N>1. The output terminal of the temperature coefficient control circuit 14 is connected to the control terminal of the target temperature compensation circuit 11. The temperature coefficient control circuit 14 is configured to generate the initial selection signal En based on the N-th temperature sub-signal Tempcode<N−1>, the temperature coefficient compensation enable signal Testmode_En, and the temperature coefficient control signal Testmode_PosEn such that the initial selection signal En and the initial carry signal C0 can be set to be reverse-phase signals, providing the initial carry signal C0 to the addition circuit 12, and enabling the target overflow prevention sub-circuit 131 to generate the first overflow prevention signal y1 and the second overflow prevention signal y2 based on the initial selection signal En and the target carry signal Cout so as to prevent an operation result of the addition circuit 12 from overflowing.

In some embodiments, still referring to FIG. 6, the N-th temperature sub-signal Tempcode<N−1> can be set such that a high level indicates a low temperature and a low level indicates a high temperature. In addition, the temperature coefficient compensation enable signal Testmode_En is set such that in a period of a low level, no temperature coefficient adjustment is performed on the initial control signal Mde<N−1:0>, that is, no temperature compensation is performed on the delay time of the target delay signal, and the target temperature compensation control signal Testmode_DLY<N−1:0> is correspondingly equal to the initial control signal Mde<N−1:0>. A period in which the temperature coefficient compensation enable signal Testmode_En has a high level and the temperature coefficient control signal Testmode_PosEn has a high level may be defined as a positive temperature coefficient mode. When the temperature is high, a delay time needs to be increased, and when the temperature is low, a delay time needs to be decreased. In some embodiments, a period in which the temperature coefficient compensation enable signal Testmode_En has a high level and the temperature coefficient control signal Testmode_PosEn has a low level may be defined as a negative temperature coefficient mode. When the temperature is high, a delay time needs to be decreased, and when the temperature is low, a delay time needs to be increased. i∈(1, N], both i and N are positive integers, and N>1. In the present invention, the initial control signal Mde<N−1:0> is adjusted to control the delay time of the target delay signal, thereby implementing targeted compensation for a change amount of a delay time caused by a temperature in the positive temperature coefficient mode or the negative temperature coefficient mode, meeting requirements of different application scenarios, improving performance of the product, and expanding an application range of the product. It should be noted that both the high level and the low level mentioned in the above some embodiments are relative concepts (i.e., a voltage value of the high level is larger than a voltage value of the low level corresponding to the high level), and limit neither a specific voltage value of the high level nor a specific voltage value of the low level. In addition, high levels applied to different signal lines in some embodiments of the present invention do not have to be equal. A person skilled in the art should understand that respective values of the high level and the low level can be personally set based on process nodes, speed requirements, reliability requirements, and the like.

It should be noted that, the definitions of the positive temperature coefficient mode or the negative temperature coefficient mode in the above some embodiments are intended to provide examples for describing specific implementation principles of some embodiments of the present invention. A person skilled in the art can equivalently define reverse-phase signals without doubt under motivation of the disclosed content. Therefore, same/similar variants made to some embodiments of the present invention without creative efforts shall fall within the protection scope of the present invention.

In some embodiments, the delay circuit can be configured to include N target delay sub-circuits and N target logic input sub-circuits. An input terminal of the first target delay sub-circuit is configured to receive the initial delay signal Signal_in. An i-th target logic input sub-circuit includes a first input terminal connected to an input terminal of the i-th target delay sub-circuit, a second input terminal connected to an output terminal of the i-th target delay sub-circuit, and a third input terminal configured to receive the i-th target temperature compensation control sub-signal Testmode_DLY<i−1>. An output terminal of an N-th target logic input sub-circuit serves as an output terminal of the delay circuit and is configured to output the target delay signal Signal_out. i∈(1, N], both i and N are positive integers, and N>1. An input terminal of a j-th target delay sub-circuit is connected to an output terminal of a (j−1)-th target logic input sub-circuit, where j∈[2, N] and j is a positive integer. It can be understood that delay times of different target delay sub-circuits may be different, a delay time of the j-th target delay sub-circuit is longer than a delay time of a (j−1)-th target delay sub-circuit, and the initial control signal Mde<N−1:0> can control whether the corresponding target delay sub-circuit performs delay processing on the initial delay signal. For example, when the initial control sub-signal Mde<0> has a high level, i.e., is a digital signal "1", the first target delay sub-circuit does not perform a first-stage delay operation on the initial delay signal Signal_in. On the contrary, when the initial control sub-signal Mde<0> has a low level, i.e., is a digital signal "0", the first target delay sub-circuit performs a first-stage delay operation on the initial delay signal Signal_in. In addition, the initial control signal Mde<N−1:0> represents a binary value. Increasing the initial control signal Mde<N−1:0> can decrease the delay time, and decreasing the initial control signal Mde<N−1:0> can increase the delay time. Temperature compensation is performed on the initial control signal Mde<N−1:0> to obtain the target temperature compensation control signal Testmode_DLY<N−1:0>. In addition, the target temperature compensation control signal Testmode_DLY is used to control the delay circuit to compensate a change amount of a signal delay time caused by a temperature change to obtain a temperature compensated target delay signal Signal_out such that an actual delay time of a delay circuit reaches an expected value.

Figure 7:
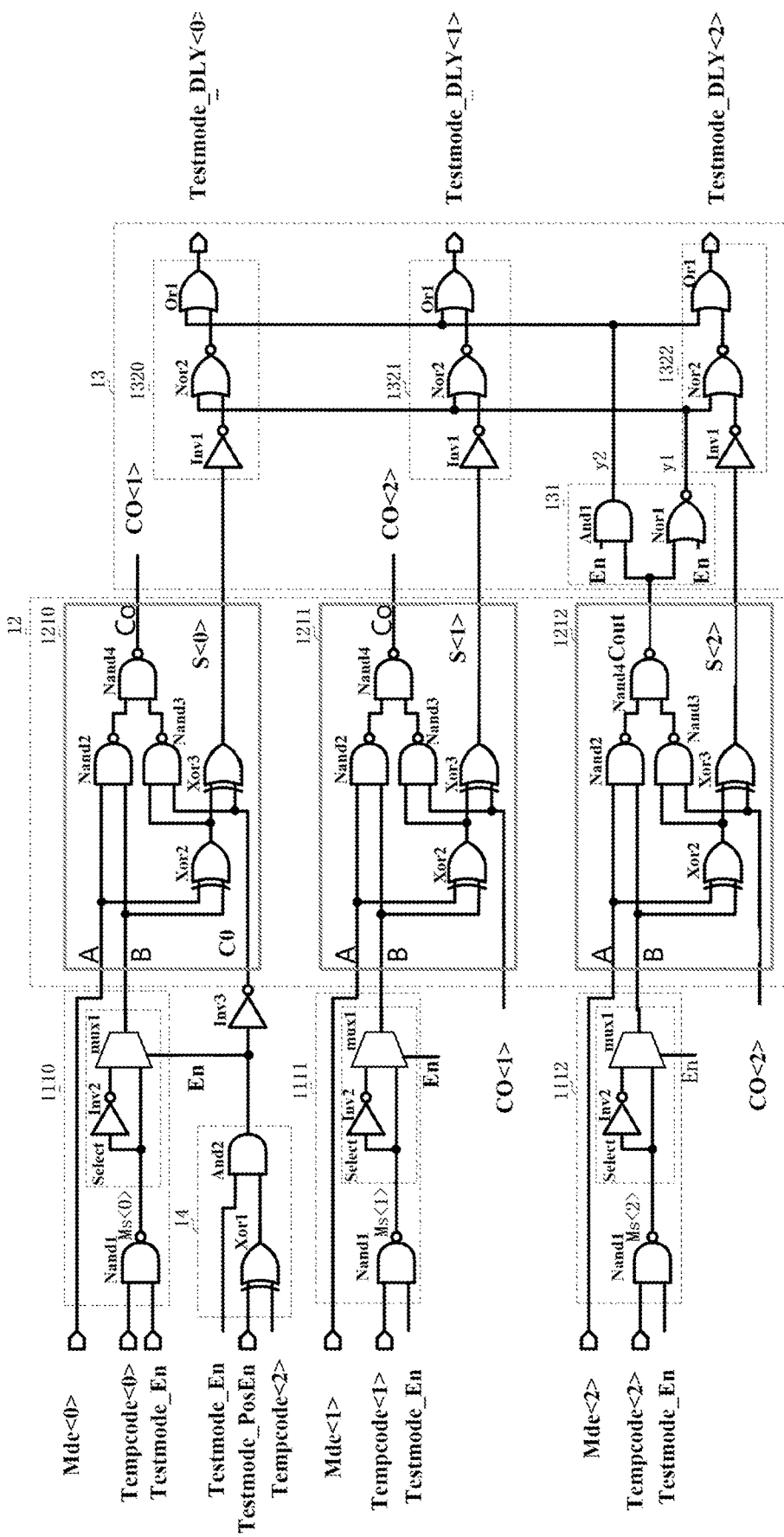
FIG. 7 is a schematic circuit diagram of a temperature compensation control circuit in delay circuitry according to some embodiments of the present invention.

In some embodiments, referring to FIG. 7, N=3 is used as an example to describe specific implementation principles of some embodiments of the present invention. The target overflow prevention sub-circuit 131 includes a first NOR gate Nor and a first AND gate And1. The first NOR gate Nor includes a first input terminal configured to receive the initial selection signal En, a second input terminal connected to the carry output terminal of the adder 1212 at the last stage, and an output terminal as the first output terminal of the target overflow prevention sub-circuit 131 and connected to the second input terminals of the logic output sub-circuit 1320, the logic output sub-circuit 1321, and the logic output sub-circuit 1322. The first AND gate And1 includes a first input terminal configured to receive the initial selection signal En, a second input terminal connected to the carry output terminal of the adder 1212 at the last stage, and an output terminal as the second output terminal of the target overflow prevention sub-circuit 131 and connected to the third input terminals of the logic output sub-circuit 1320, the logic output sub-circuit 1321, and the logic output sub-circuit 1322. The first input terminal of the first NOR gate Nor and the first input terminal of the first AND gate And1 jointly receive sub-signals received at the first input terminal of the target overflow prevention sub-circuit 131, and the second input terminal of the first NOR gate Nor and the second input terminal of the first AND gate And1 jointly receive sub-signals received at the second input terminal of the target overflow prevention sub-circuit 131.

In some embodiments, still referring to FIG. 7, the logic output sub-circuit 1320, the logic output sub-circuit 1321, and the logic output sub-circuit 1322 each include a first inverter Inv1, a second NOR gate Nor2, and a first OR gate Or1. The logic output sub-circuit 1320 is used as an example below to describe circuit structures and specific implementation principles of the logic output sub-circuit 1320, the logic output sub-circuit 1321, and the logic output sub-circuit 1322. In the logic output sub-circuit 1320, an input terminal of the first inverter Inv1 serves as the first input terminal of the logic output sub-circuit 1320. The second NOR gate Nor2 includes a first input terminal connected to an output terminal of the first inverter Inv1, and a second input terminal as the second input terminal of the logic output sub-circuit 1320 and connected to the output terminal of the first NOR gate Nor1 for receiving a first overflow prevention signal y1. The first OR gate Or1 includes a first input terminal connected to an output terminal of the second NOR gate Nor2, a second input terminal as the third input terminal of the logic output sub-circuit 1320 and connected to the output terminal of the first AND gate And1 for receiving a second overflow prevention signal y2, and an output terminal as the output terminal of the logic output sub-circuit 1320 for outputting a target temperature compensation control sub-signal Testmode_DLY<0>. Similarly, for specific circuit structures of the logic output sub-circuit 1321 and the logic output sub-circuit 1322, references are made to the logic output sub-circuit 1320, and details are not described again.

In some embodiments, still referring to FIG. 7, the target temperature compensation sub-circuit 1110, the target temperature compensation sub-circuit 1111, and the target temperature compensation sub-circuit 1112 each include a first NAND gate Nand1 and a selection output sub-circuit Select. A specific circuit structure of the target temperature compensation sub-circuit 1110 is used as an example below to describe an operation principle of each target temperature compensation sub-circuit. In the target temperature compensation sub-circuit 1110, a first NAND gate Nand1 includes a first input terminal as the first input terminal of the target temperature compensation sub-circuit 1110 and configured to receive the temperature sub-signal Tempcode<0>, a second input terminal as the second input terminal of the target temperature compensation sub-circuit 1110 and configured to receive the temperature coefficient compensation enable signal Testmode_En, and an output terminal outputting a first intermediate temperature sub-signal Ms<0>. The selection output sub-circuit Select includes an input terminal connected to the output terminal of the first NAND gate Nand1 for receiving the first intermediate temperature sub-signal Ms<0>, a control terminal as the control terminal of the target temperature compensation sub-circuit 1110 and configured to receive the initial selection signal En, and an output terminal as the output terminal of the target temperature compensation sub-circuit 1110 and configured to output the target temperature compensation sub-signal Temp_out<0>. If the initial selection signal En has a high level, the target temperature compensation sub-signal Temp_out<0> and the first intermediate temperature sub-signal Ms<0> are reverse-phase signals, or if the initial selection signal En has a low level, the target temperature compensation sub-signal Temp_out<0> and the first intermediate temperature sub-signal Ms<0> are in-phase signals. Circuit structures and operation principles of the target temperature compensation sub-circuit 1111 and the target temperature compensation sub-circuit 1112 are similar to those of the target temperature compensation sub-circuit 1110. Mutual references can be made and details are not described again.

In some embodiments, still referring to FIG. 7, a specific circuit structure of the target temperature compensation sub-circuit 1110 is used as an example below to describe an operation principle of each target temperature compensation sub-circuit. The selection output sub-circuit Select in the target temperature compensation sub-circuit 1110 includes a second inverter Inv2 and a multiplexer mux1. An input terminal of the second inverter Inv2 is connected to the output terminal of the first NAND gate Nand1. A first input terminal of the data selector mux1 is connected to an output terminal of the second inverter Inv2, and a second input terminal of the data selector mux1 is connected to the output terminal of the first NAND gate Nand1. An output terminal of the data selector mux1 outputs a target temperature compensation sub-signal Temp_out<0>, and a control terminal of the data selector mux1 is configured to receive an initial selection signal En. If the initial selection signal En has a high level such as "1", the target temperature compensation sub-signal Temp_out<0> and the first intermediate temperature sub-signal Ms<0> are reverse-phase signals. If the initial selection signal En has a low level such as "0", the target temperature compensation sub-signal Temp_out<0> and the first intermediate temperature sub-signal Ms<0> are in-phase signals. Implementation principles and circuit structures of the target temperature compensation sub-circuit 1111 and the target temperature compensation sub-circuit 1112 are similar to those of the target temperature compensation sub-circuit 1110. Mutual references can be made and details are not described again.

In some embodiments, still referring to FIG. 7, the temperature coefficient control circuit 14 includes a first XOR gate Xor1 and a second AND gate And2. The first XOR gate Xor1 includes a first input terminal as the third input terminal of the temperature coefficient control circuit and configured to receive a third temperature sub-signal Tempcode<2>, and a second input terminal as the second input terminal of the temperature coefficient control circuit 14 and configured to receive the temperature coefficient control signal Testmode_PosEn. The second AND gate And2 includes a first input terminal connected to an output terminal of the first XOR gate Xor1, a second input terminal as the first input terminal of the temperature coefficient control circuit 14 and configured to receive the temperature coefficient compensation enable signal Testmode_En, and an output terminal as the output terminal of the temperature coefficient control circuit 14 and configured to output the initial selection signal En.

In some embodiments, still referring to FIG. 7, the addition circuit 12 includes an adder 1210, an adder 1211, and an adder 1212. A carry input terminal of an adder 1210 at a first stage serves as the carry input terminal of the addition circuit 12 and is configured to receive the initial carry signal C0, and a carry output terminal of an adder 1212 at a last stage serves as the carry output terminal of the addition circuit 12 and is configured to output the target carry signal Cout. A carry output terminal of an adder at each stage is connected to a carry input terminal of an adder at a next adjacent stage. Signal output terminals of the adder 1210, the adder 1211, and the adder 1212 jointly output sub-signals for output from the first output terminal of the addition circuit 12 and are connected to the first input terminal of the logic output circuit 13. Signal output terminals of the adders at all stages output corresponding initial temperature compensation control signals S<2:0> and provide the initial temperature compensation control signals S<2:0> to the logic output circuit 13. First input terminals of the adders at all stages jointly receive sub-signals received at the first input terminal of the addition circuit 12 for receiving an initial control signal Mde<2:0>. Second input terminals of the adder 1210, the adder 1211, and the adder 1212 jointly receive sub-signals received at the second input terminal of the addition circuit 12 for receiving a target temperature compensation signal Tempout<2:0>. The adder 1210, the adder 1211, and the adder 1212 each include a second XOR gate Xor2, a third XOR gate Xor3, a second NAND gate Nand2, a third NAND gate Nand3, and a fourth NAND gate Nand4. A specific circuit structure of the adder 1210 is used as an example below to describe an operation principle of each adder. In the adder 1210, the second NAND gate Nand2 includes a first input terminal receiving an initial control sub-signal Mde<0>, and a second input terminal connected to the output terminal of the target temperature compensation sub-circuit 1110 and configured to receive a target temperature compensation sub-signal Tempout<0>. The second XOR gate Xor2 includes a first input terminal receiving an initial control sub-signal Mde<0>, and a second input terminal connected to the output terminal of the target temperature compensation sub-circuit 1110 and configured to receive a target temperature compensation sub-signal Tempout<0>. The third XOR gate Xor3 includes a first input terminal connected to the output terminal of the second XOR gate Xor2, a second input terminal receiving an initial carry signal C0, and an output terminal as the signal output terminal of the adder 1210 and providing a temperature sub-signal Tempcode<0> to the logic output sub-circuit 1320. The third NAND gate Nand3 includes a first input terminal connected to the output terminal of the second XOR gate Xor2, and a second input terminal receiving an initial carry signal C0. The fourth NAND gate Nand4 includes a first input terminal connected to the output terminal of the second NAND gate Nand2, a second input terminal connected to the output terminal of the third NAND gate Nand3, and an output terminal as the carry output terminal of the adder 1210 and providing a carry signal CO<1> to the adder 1211. Circuit structures and operation principles of the adder 1211 and the adder 1212 are similar to those of the adder 1210. Details are not described again.

Figure 8:
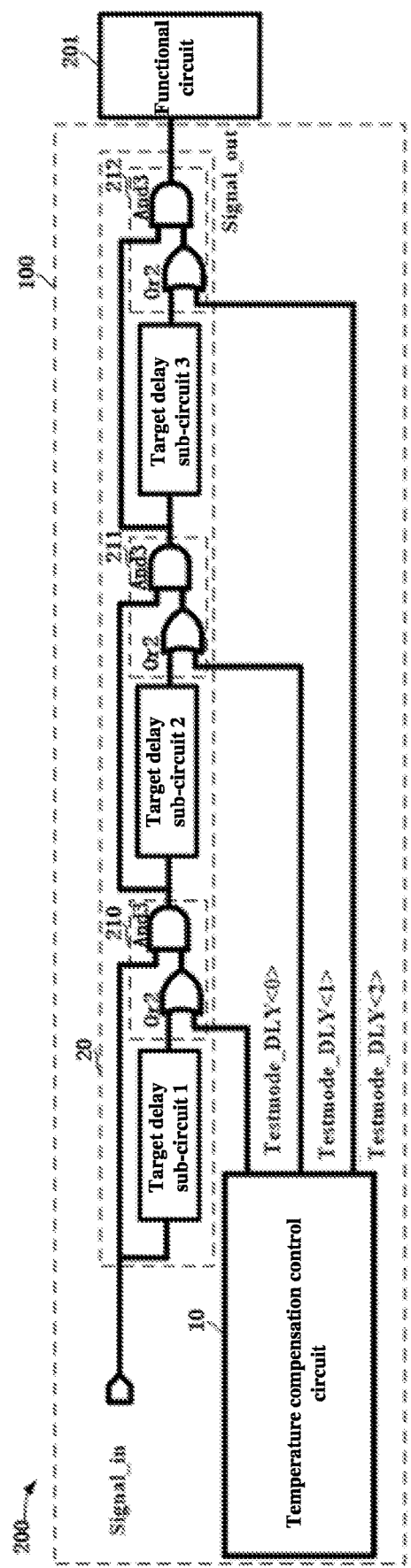
FIG. 8 is a schematic circuit diagram of a semiconductor memory according to some embodiments of the present invention.

In some embodiments, referring to FIG. 8, the delay circuit 20 includes a target delay sub-circuit 1, a target delay sub-circuit 2, a target delay sub-circuit 3, a target logic input sub-circuit 210, a target logic input sub-circuit 211, and a target logic input sub-circuit 212. An input terminal of the first target delay sub-circuit 1 is configured to receive an initial delay signal Signal_in. The first target logic input sub-circuit 210 includes a first input terminal connected to the input terminal of the first target delay sub-circuit 1, a second input terminal connected to an output terminal of the first target delay sub-circuit 1, and a third input terminal configured to receive a first target temperature compensation control sub-signal Testmode_DLY<0>. The second target logic input sub-circuit 211 includes a first input terminal connected to an input terminal of the second target delay sub-circuit 2, a second input terminal connected to an output terminal of the second target delay sub-circuit 2, and a third input terminal configured to receive a second target temperature compensation control sub-signal Testmode_DLY<1>. The third target logic input sub-circuit 212 includes a first input terminal connected to an input terminal of the third target delay sub-circuit 3, a second input terminal connected to an output terminal of the third target delay sub-circuit 3, and a third input terminal configured to receive a third target temperature compensation control sub-signal Testmode_DLY<2>.

In some embodiments, still referring to FIG. 8, the target logic input sub-circuit 210, the target logic input sub-circuit 211, and the target logic input sub-circuit 212 each include a second OR gate Or2 and a third AND gate And3. In the target logic input sub-circuit 210, the second OR gate Or2 includes a first input terminal as a second input terminal of the target logic input sub-circuit 210, and a second input terminal as a third input terminal of the target logic input sub-circuit 210 and configured to receive a target temperature compensation control sub-signal Testmode_DLY<0>. The third AND gate And3 includes a first input terminal as a first input terminal of the target logic input sub-circuit 210 and configured to receive an initial delay signal Signal_in, a second input terminal connected to an output terminal of the second OR gate Or2, and an output terminal as an output terminal of the target logic input sub-circuit 210. In the target logic input sub-circuit 211, the second OR gate Or2 includes a first input terminal as a second input terminal of the target logic input sub-circuit 211 and connected to an output terminal of the second target delay sub-circuit 2, and a second input terminal as a third input terminal of the target logic input sub-circuit 211 and configured to receive a target temperature compensation control sub-signal Testmode_DLY<1>. The third AND gate And3 includes a first input terminal as a first input terminal of the target logic input sub-circuit 211 and connected to an input terminal of the second target delay sub-circuit 2, a second input terminal connected to an output terminal of the second OR gate Or2, and an output terminal as an output terminal of the target logic input sub-circuit 211. In the target logic input sub-circuit 212, the second OR gate Or2 includes a first input terminal as a second input terminal of the target logic input sub-circuit 212 and connected to an output terminal of the third target delay sub-circuit 3, and a second input terminal as a third input terminal of the target logic input sub-circuit 212 and configured to receive a target temperature compensation control sub-signal Testmode_DLY<2>. The third AND gate And3 includes a first input terminal as a first input terminal of the target logic input sub-circuit 212 and connected to an input terminal of the third target delay sub-circuit 3, a second input terminal connected to an output terminal of the second OR gate Or2, and an output terminal as an output terminal of the target logic input sub-circuit 212 and configured to output a temperature compensated target delay signal Signal_out.

In some embodiments, still referring to FIG. 8, a temperature compensation control circuit 10 generates a target temperature compensation control signal Testmode_DLY<2:

0>, and a target temperature compensation control signal Testmode_DLY<2:0> is used to control a delay circuit 20 to compensate a change amount of a signal delay time caused by a temperature change to obtain a temperature compensated target delay signal Signal_out such that an actual delay time of the delay circuitry 100 reaches an expected value. As such, a delay time of a target delay signal Signal_out generated by the delay circuitry 100 is dynamically compensated based on the real-time ambient temperature signal Tempcode, thereby avoiding a large difference between a delay time of an actually generated target delay signal Signal_out and a delay time of a desired target delay signal Signal_out caused by a temperature change, improving stability and accuracy of signal transmission, and improving performance and reliability of an integrated circuit.

In some embodiments, still referring to FIG. 7, FIG. 8, and Table 1, the third temperature sub-signal Tempcode<2> can be set such that "1" indicates a low temperature and "0" indicates a high temperature. In addition, the temperature coefficient compensation enable signal Testmode_En is set such that in a period of a low level, no temperature coefficient adjustment is performed on the initial control signal Mde<2:0>, that is, no temperature compensation is performed on the delay time of the target delay signal, and the target temperature compensation control signal Testmode_DLY<2:0> is correspondingly equal to the initial control signal Mde<2:0>. A period in which the temperature coefficient compensation enable signal Testmode_En has a high level and the temperature coefficient control signal Testmode_PosEn has a high level may be defined as a positive temperature coefficient mode. When the temperature is high, the initial control signal Mde<2:0> adjusts the delay time to increase, and when the temperature is low, the initial control signal Mde<2:0> adjusts the delay time to decrease. In some embodiments, a period in which the temperature coefficient compensation enable signal Testmode_En has a high level and the temperature coefficient control signal Testmode_PosEn has a low level may be defined as a negative temperature coefficient mode. When the temperature is high, the initial control signal Mde<2:0> adjusts the delay time to decrease, and when the temperature is low, the initial control signal Mde<2:0> adjusts the delay time to increase. As such, targeted compensation for a change amount of a delay time caused by a temperature in the positive temperature coefficient mode or the negative temperature coefficient mode is implemented, requirements of different application scenarios are met, performance of the product is improved, and an application range of the product is expanded.

TABLE 1

| Testmode_En | Testmode_PosEn | Mde<2:0> | Tempcode<2:0> | Testmode_DLY<2:0> |
|---|---|---|---|---|
| 1 | 0 | <000> | <000> | <000> |
|  |  | <000> | <001> | <000> |
|  |  | <000> | <010> | <000> |
|  |  | <000> | <011> | <000> |
|  |  | <000> | <100> | <100> |
|  |  | <000> | <101> | <101> |
|  |  | <000> | <110> | <110> |
|  |  | <000> | <111> | <111> |
|  |  | . . . | . . . | . . . |
|  |  | <010> | <000> | <010> |
|  |  | <010> | <001> | <001> |
|  |  | <010> | <010> | <000> |
|  |  | <010> | <011> | <000> |
|  |  | <010> | <100> | <110> |
|  |  | <010> | <101> | <111> |
|  |  | <010> | <110> | <111> |
|  |  | <010> | <111> | <111> |
|  |  | . . . | . . . | . . . |
|  |  | <111> | <000> | <111> |
|  |  | <111> | <001> | <110> |
|  |  | <111> | <010> | <101> |
|  |  | <111> | <011> | <100> |
|  |  | <111> | <100> | <111> |
|  |  | <111> | <101> | <111> |
|  |  | <111> | <110> | <111> |
|  |  | <111> | <111> | <111> |
| 1 | 1 | <000> | <000> | <000> |
|  |  | <000> | <001> | <001> |
|  |  | <000> | <010> | <010> |
|  |  | <000> | <011> | <011> |
|  |  | <000> | <100> | <000> |
|  |  | <000> | <101> | <000> |
|  |  | <000> | <110> | <000> |
|  |  | <000> | <111> | <000> |
|  |  | . . . | . . . | . . . |
|  |  | <010> | <000> | <010> |
|  |  | <010> | <001> | <011> |
|  |  | <010> | <010> | <100> |
|  |  | <010> | <011> | <101> |
|  |  | <010> | <100> | <000> |
|  |  | <010> | <101> | <000> |
|  |  | <010> | <110> | <000> |
|  |  | <010> | <111> | <000> |
|  |  | . . . | . . . | . . . |
|  |  | <111> | <000> | <111> |
|  |  | <111> | <001> | <111> |
|  |  | <111> | <010> | <111> |

TABLE 1-continued

| Testmode_En | Testmode_PosEn | Mde<2:0> | Tempcode<2:0> | Testmode_DLY<2:0> |
|---|---|---|---|---|
| | | <111> | <011> | <111> |
| | | <111> | <100> | <011> |
| | | <111> | <101> | <010> |
| | | <111> | <110> | <001> |
| | | <111> | <111> | <000> |

In some embodiments, still referring to FIG. 8, a semiconductor memory 200 includes the delay circuitry 100 in any one of some embodiments of the present invention, configured to generate a temperature compensated target delay signal Signal_out based on an initial delay signal Signal_in, an initial control signal Mde, a real-time ambient temperature signal Tempcode, and a temperature coefficient control signal Testmode_PosEn, and provide the target delay signal Signal_out to a functional circuit 201 such that the functional circuit 201 triggers a predetermined target action at a target time to generate a target function. In some embodiments, the functional circuit 201 may include at least one of a mode register, a frequency divider, a microcontroller, and a clock circuit. A temperature compensation control circuit 10 generates a target temperature compensation control signal Testmode_DLY<2:0>, and a target temperature compensation control signal Testmode_DLY<2:0> is used to control a delay circuit 20 to compensate a change amount of a signal delay time caused by a temperature change to obtain a temperature compensated target delay signal Signal_out such that an actual delay time of the delay circuitry 100 reaches an expected value. As such, a delay time of a target delay signal Signal_out generated by the delay circuitry 100 is dynamically compensated based on the real-time ambient temperature signal Tempcode, thereby avoiding a large difference between a delay time of an actually generated target delay signal Signal_out and a delay time of a desired target delay signal Signal_out caused by a temperature change. Therefore, the predetermined target action can be accurately triggered at the target time to generate the target function, thereby improving stability and accuracy of signal transmission, and improving performance and reliability of an integrated circuit.

It should be noted that the above some embodiments are for illustrative purposes only and are not meant to limit the present invention.

The technical features of the some embodiments described above may be combined arbitrarily. For brevity of description, not all possible combinations of the technical features of the some embodiments are described. However, the combinations of these technical features should be considered as falling within the scope of this specification provided that there is no contradiction between the combinations.

The above some embodiments merely describe some implementations of the present invention, and description of these implementations is relatively specific and detailed, but should not be understood as a limitation on the scope of this application. It should be noted that a person of ordinary skill in the art can make any variations and improvements without departing from the concept of the present invention, and these variations and improvements shall fall within the protection scope of the present invention. Therefore, the protection scope of the present invention shall be subject to the appended claims.

What is claimed is:

1. Delay circuitry, comprising:
a temperature compensation control circuit, configured to generate a target temperature compensation control signal based on an initial control signal, a real-time ambient temperature signal, a temperature coefficient compensation enable signal, and a temperature coefficient control signal; and
a delay circuit, connected to the temperature compensation control circuit and configured to generate a temperature compensated target delay signal based on the target temperature compensation control signal and an initial delay signal.

2. The delay circuitry according to claim 1, wherein the temperature compensation control circuit comprises:
a target temperature compensation circuit, comprising a first input terminal configured to receive the real-time ambient temperature signal, a second input terminal configured to receive the temperature coefficient compensation enable signal, a control terminal configured to receive an initial selection signal, and an output terminal configured to output a target temperature compensation signal;
an addition circuit, comprising a first input terminal configured to receive the initial control signal, a second input terminal connected to the output terminal of the target temperature compensation circuit to receive the target temperature compensation signal, a carry input terminal configured to receive an initial carry signal, a first output terminal configured to output an initial temperature compensation control signal, and a carry output terminal configured to output a target carry signal; and
a logic output circuit, comprising a first input terminal connected to the first output terminal of the addition circuit to receive the initial temperature compensation control signal, a second input terminal connected to the carry output terminal of the addition circuit to receive the target carry signal, and a third input terminal configured to receive the initial selection signal and output the target temperature compensation control signal through an output terminal after performing logic processing on the initial temperature compensation control signal, the target carry signal, and the initial selection signal.

3. The delay circuitry according to claim 2, wherein the addition circuit comprises:
N cascaded adders, wherein N>1, N is a positive integer, a carry output terminal of an adder at each stage is connected to a carry input terminal of an adder at a next adjacent stage, a carry input terminal of an adder at a first stage serves as the carry input terminal of the addition circuit and is configured to receive the initial carry signal, and a carry output terminal of an adder at a last stage serves as the carry output terminal of the addition circuit and is configured to output the target carry signal, signal output terminals of the adders at all stages jointly output sub-signals for output from the first output terminal of the addition circuit and are connected to the first input terminal of the logic output circuit, first input terminals of the adders at all stages jointly receive sub-signals received at the first input terminal of the addition circuit, and second input terminals of the adders at all stages jointly receive sub-signals received at the second input terminal of the addition circuit.

4. The delay circuitry according to claim 3, wherein the logic output circuit comprises:
   a target overflow prevention sub-circuit, comprising a first input terminal as the third input terminal of the logic output circuit to receive the initial selection signal, and a second input terminal as the second input terminal of the logic output circuit and connected to the carry output terminal of the adder at the last stage; and
   N logic output sub-circuits, wherein a first input terminal of an i-th logic output sub-circuit is connected to a signal output terminal of an adder at an i-th stage, a second input terminal of each of the logic output sub-circuits is connected to a first output terminal of the target overflow prevention sub-circuit, a third input terminal of each of the logic output sub-circuits is connected to a second output terminal of the target overflow prevention sub-circuit, output terminals of the logic output sub-circuits jointly output sub-signals for output from the output terminal of the logic output circuit, first input terminals of the logic output sub-circuits jointly receive sub-signals received at the first input terminal of the logic output circuit, i∈(1, N], and i is a positive integer, wherein
   the target overflow prevention sub-circuit is configured to prevent an operation result of the addition circuit from overflowing.

5. The delay circuitry according to claim 4, wherein the target overflow prevention sub-circuit comprises:
   a first NOR gate, comprising a first input terminal to receive the initial selection signal, a second input terminal connected to the carry output terminal of the adder at the last stage, and an output terminal as the first output terminal of the target overflow prevention sub-circuit and connected to the second input terminal of each of the logic output sub-circuits; and
   a first AND gate, comprising a first input terminal to receive the initial selection signal, a second input terminal connected to the carry output terminal of the adder at the last stage, and an output terminal as the second output terminal of the target overflow prevention sub-circuit and connected to the third input terminal of each of the logic output sub-circuits, wherein
   the first input terminal of the first NOR gate and the first input terminal of the first AND gate jointly receive sub-signals received at the first input terminal of the target overflow prevention sub-circuit, and the second input terminal of the first NOR gate and the second input terminal of the first AND gate jointly receive sub-signals received at the second input terminal of the target overflow prevention sub-circuit.

6. The delay circuitry according to claim 5, wherein each of the logic output sub-circuits comprises:
   a first inverter, wherein an input terminal of the first inverter serves as the first input terminal of the logic output sub-circuit;
   a second NOR gate, comprising a first input terminal connected to an output terminal of the first inverter, and a second input terminal as the second input terminal of the logic output sub-circuit and connected to the output terminal of the first NOR gate; and
   a first OR gate, comprising a first input terminal connected to an output terminal of the second NOR gate, a second input terminal as the third input terminal of the logic output sub-circuit and connected to the output terminal of the first AND gate, and an output terminal as the output terminal of the logic output sub-circuit.

7. The delay circuitry according to claim 4, wherein the target temperature compensation control signal comprises N target temperature compensation control sub-signals, and the i-th logic output sub-circuit is configured to output an i-th target temperature compensation control sub-signal.

8. The delay circuitry according to claim 7, wherein the delay circuit comprises N target delay sub-circuits and N target logic input sub-circuits;
   an input terminal of a first target delay sub-circuit is configured to receive the initial delay signal;
   an i-th target logic input sub-circuit comprises a first input terminal connected to an input terminal of the i-th target delay sub-circuit, a second input terminal connected to an output terminal of the i-th target delay sub-circuit, and a third input terminal configured to receive the i-th target temperature compensation control sub-signal;
   an output terminal of an N-th target logic input sub-circuit serves as an output terminal of the delay circuit and is configured to output the target delay signal; and
   an input terminal of a j-th target delay sub-circuit is connected to an output terminal of a (j−1)-th target logic input sub-circuit, wherein j∈[2, N] and j is a positive integer.

9. The delay circuitry according to claim 8, wherein the target logic input sub-circuit comprises:
   a second OR gate, comprising a first input terminal as the second input terminal of the target logic input sub-circuit, and a second input terminal as the third input terminal of the target logic input sub-circuit and configured to receive the target temperature compensation control sub-signal; and
   a third AND gate, comprising a first input terminal as the first input terminal of the target logic input sub-circuit, a second input terminal connected to an output terminal of the second OR gate, and an output terminal as the output terminal of the target logic input sub-circuit.

10. The delay circuitry according to claim 3, wherein:
   the real-time ambient temperature signal comprises N temperature sub-signals, and the target temperature compensation signal comprises N target temperature compensation sub-signals;
   the target temperature compensation circuit comprises N target temperature compensation sub-circuits;
   an i-th target temperature compensation sub-circuit comprises a first input terminal configured to receive an i-th temperature sub-signal, a second input terminal configured to receive the temperature coefficient compensation enable signal, a control terminal configured to receive the initial selection signal, and an output terminal configured to provide an i-th target temperature compensation sub-signal to the second input terminal of an adder at an i-th stage, wherein i∈(1, N] and i is a positive integer; and
   first input terminals of the target temperature compensation sub-circuits jointly receive sub-signals received at the first input terminal of the target temperature compensation circuit, second input terminals of the target temperature compensation sub-circuits jointly receive sub-signals received at the second input terminal of the target temperature compensation circuit, and control terminals of the target temperature compensation sub-circuits jointly receive sub-signals received at the control terminal of the target temperature compensation circuit.

11. The delay circuitry according to claim 10, wherein each of the target temperature compensation sub-circuits comprises:
a first NAND gate, comprising a first input terminal as the first input terminal of the target temperature compensation sub-circuit and configured to receive the temperature sub-signal, a second input terminal as the second input terminal of the target temperature compensation sub-circuit and configured to receive the temperature coefficient compensation enable signal, and an output terminal outputting an intermediate temperature sub-signal; and
a selection output sub-circuit, comprising an input terminal connected to the output terminal of the first NAND gate, a control terminal as the control terminal of the target temperature compensation sub-circuit and configured to receive the initial selection signal, and an output terminal as the output terminal of the target temperature compensation sub-circuit and configured to output the target temperature compensation sub-signal, wherein
if the initial selection signal has a high level, a target temperature compensation sub-signal and the intermediate temperature sub-signal are reverse-phase signals, or if the initial selection signal has a low level, the target temperature compensation sub-signal and the intermediate temperature sub-signal are in-phase signals.

12. The delay circuitry according to claim 10, wherein the temperature compensation control circuit further comprises:
a temperature coefficient control circuit, comprising a first input terminal configured to receive the temperature coefficient compensation enable signal, a second input terminal configured to receive the temperature coefficient control signal, a third input terminal configured to receive an N-th temperature sub-signal, and an output terminal outputting the initial selection signal, wherein
the output terminal of the temperature coefficient control circuit is connected to the control terminal of the target temperature compensation circuit.

13. The delay circuitry according to claim 12, wherein the temperature coefficient control circuit comprises:
a first XOR gate, comprising a first input terminal as the third input terminal of the temperature coefficient control circuit and configured to receive the N-th temperature sub-signal, and a second input terminal as the second input terminal of the temperature coefficient control circuit and configured to receive the temperature coefficient control signal; and
a second AND gate, comprising a first input terminal connected to an output terminal of the first XOR gate, a second input terminal as the first input terminal of the temperature coefficient control circuit and configured to receive the temperature coefficient compensation enable signal, and an output terminal as the output terminal of the temperature coefficient control circuit and configured to output the initial selection signal.

14. The delay circuitry according to claim 3, wherein the initial control signal comprises N initial control sub-signals, the first input terminal of an adder at an i-th stage is configured to receive an i-th initial control sub-signal, i∈(1, N], and i is a positive integer.

15. The delay circuitry according to claim 2, wherein the initial selection signal and the initial carry signal are active-low signals.

16. A semiconductor memory, comprising delay circuitry, wherein the delay circuitry comprises:
a temperature compensation control circuit, configured to generate a target temperature compensation control signal based on an initial control signal, a real-time ambient temperature signal, a temperature coefficient compensation enable signal, and a temperature coefficient control signal; and
a delay circuit, connected to the temperature compensation control circuit and configured to generate a temperature compensated target delay signal based on the target temperature compensation control signal and an initial delay signal.

17. The semiconductor memory according to claim 16, wherein the temperature compensation control circuit comprises:
a target temperature compensation circuit, comprising a first-type input terminal configured to receive the real-time ambient temperature signal, a second-type input terminal configured to receive the temperature coefficient compensation enable signal, a control terminal configured to receive an initial selection signal, and an output terminal configured to output a target temperature compensation signal;
an addition circuit, comprising a first-type input terminal configured to receive the initial control signal, a second-type input terminal connected to the output terminal of the target temperature compensation circuit to receive the target temperature compensation signal, a carry input terminal configured to receive an initial carry signal, a first-type output terminal configured to output an initial temperature compensation control signal, and a carry output terminal configured to output a target carry signal; and
a logic output circuit, comprising a first-type input terminal connected to the first-type output terminal of the addition circuit to receive the initial temperature compensation control signal, a second-type input terminal connected to the carry output terminal of the addition circuit to receive the target carry signal, and a third-type input terminal configured to receive the initial selection signal and output the target temperature compensation control signal through an output terminal after performing logic processing on the initial temperature compensation control signal, the target carry signal, and the initial selection signal.

18. The semiconductor memory according to claim 17, wherein the addition circuit comprises:
N cascaded adders, wherein N>1, N is a positive integer, a carry output terminal of an adder at each stage is connected to a carry input terminal of an adder at a next adjacent stage, a carry input terminal of an adder at a first stage serves as the carry input terminal of the addition circuit and is configured to receive the initial carry signal, and a carry output terminal of an adder at a last stage serves as the carry output terminal of the addition circuit and is configured to output the target carry signal, signal output terminals of the adders at all stages jointly output sub-signals for output from the first output terminal of the addition circuit and are connected to the first input terminal of the logic output circuit, first input terminals of the adders at all stages jointly receive sub-signals received at the first input terminal of the addition circuit, and second input terminals of the adders at all stages jointly receive sub-signals received at the second input terminal of the addition circuit.

19. The semiconductor memory according to claim 18, wherein the logic output circuit comprises:
- a target overflow prevention sub-circuit, comprising a first input terminal as the third input terminal of the logic output circuit to receive the initial selection signal, and a second input terminal as the second input terminal of the logic output circuit and connected to the carry output terminal of the adder at the last stage; and
- N logic output sub-circuits, wherein a first input terminal of an i-th logic output sub-circuit is connected to a signal output terminal of an adder at an i-th stage, a second input terminal of each of the logic output sub-circuits is connected to a first output terminal of the target overflow prevention sub-circuit, a third input terminal of each of the logic output sub-circuits is connected to a second output terminal of the target overflow prevention sub-circuit, output terminals of the logic output sub-circuits jointly output sub-signals for output from the output terminal of the logic output circuit, first input terminals of the logic output sub-circuits jointly receive sub-signals received at the first input terminal of the logic output circuit, i∈(1, N], and i is a positive integer, wherein
- the target overflow prevention sub-circuit is configured to prevent an operation result of the addition circuit from overflowing.

20. The semiconductor memory according to claim 19, wherein the target overflow prevention sub-circuit comprises:
- a first NOR gate, comprising a first input terminal to receive the initial selection signal, a second input terminal connected to the carry output terminal of the adder at the last stage, and an output terminal as the first output terminal of the target overflow prevention sub-circuit and connected to the second input terminal of each of the logic output sub-circuits; and
- a first AND gate, comprising a first input terminal to receive the initial selection signal, a second input terminal connected to the carry output terminal of the adder at the last stage, and an output terminal as the second output terminal of the target overflow prevention sub-circuit and connected to the third input terminal of each of the logic output sub-circuits, wherein
- the first input terminal of the first NOR gate and the first input terminal of the first AND gate jointly receive sub-signals received at the first input terminal of the target overflow prevention sub-circuit, and the second input terminal of the first NOR gate and the second input terminal of the first AND gate jointly receive sub-signals received at the second input terminal of the target overflow prevention sub-circuit.

\* \* \* \* \*